US007188436B2

(12) United States Patent
Stock et al.

(10) Patent No.: US 7,188,436 B2
(45) Date of Patent: Mar. 13, 2007

(54) HEATING AND DRYING APPARATUS FOR PARTICULATE MATERIAL

(75) Inventors: Charles L. Stock, Eagan, MN (US); Peder K. Langsetmo, Robinsdale, MN (US); Gregory J. Kimball, Circle Pines, MN (US); David L. Phillips, Shoreview, MN (US)

(73) Assignee: Bepex International, LLC, Minneapolis, MN (US)

( * ) Notice: Subject to any disclaimer, the term of this patent is extended or adjusted under 35 U.S.C. 154(b) by 0 days.

(21) Appl. No.: 11/125,411

(22) Filed: May 9, 2005

(65) Prior Publication Data

US 2005/0274037 A1 Dec. 15, 2005

Related U.S. Application Data

(63) Continuation of application No. 10/302,807, filed on Nov. 22, 2002, now Pat. No. 6,935,051.

(51) Int. Cl.
*F26B 17/12* (2006.01)

(52) U.S. Cl. .............................. 34/588; 34/590; 34/165; 34/178; 34/369; 34/443

(58) Field of Classification Search ................ 34/505, 34/590, 64, 147, 165, 178, 587, 588, 589, 34/369, 374, 443, 503, 504, 506, 582, 65, 34/66
See application file for complete search history.

(56) References Cited

U.S. PATENT DOCUMENTS

| | | |
|---|---|---|
| 254,308 A | 2/1882 | Hanna |
| 735,878 A | 8/1903 | Hutton |
| 779,729 A | 1/1905 | Morrison et al. |
| 1,782,244 A | 11/1930 | Nagel |
| 2,941,310 A | 6/1960 | Schaub |
| 3,869,809 A | 3/1975 | Keirn |
| 3,896,562 A | 7/1975 | Zimmerman |
| 3,905,124 A | 9/1975 | Cooper |
| 4,242,806 A | 1/1981 | McClaren |
| 4,308,669 A | 1/1982 | Noyes et al. |
| 4,337,584 A | 7/1982 | Johnson |
| 4,856,580 A | 8/1989 | Ley |
| 5,271,163 A | 12/1993 | Pikus et al. |
| 5,410,984 A | 5/1995 | Pikus et al. |
| 5,440,005 A | 8/1995 | Pikus |
| 5,454,344 A | 10/1995 | Pikus et al. |
| 5,516,880 A | 5/1996 | Walsh |
| 5,532,335 A | 7/1996 | Kimball et al. |
| 5,634,282 A | 6/1997 | Pikus |

(Continued)

*Primary Examiner*—Kenneth Rinehart
(74) *Attorney, Agent, or Firm*—Fredrikson & Byron, PA

(57) ABSTRACT

A continuous gravity flow apparatus for heating and/or drying of particulate material is vertically disposed and is provided with an inlet at the top and an outlet at the bottom. The apparatus includes a flow passage for the particulate material which is defined between an outer housing and an inner housing. Each of the outer and inner housing defines perforated wall sections allowing for the flow of hot gas through the wall of one housing, into contact with the particulate material, and then out through the wall of the other housing. Manifolds are associated with the outer and inner housings to provide for uniform flow of the gas through the material. The perforated wall sections are positioned and designed to enhance particle-to-particle movement of the material to thereby avoid particle sticking and bridging problems.

19 Claims, 6 Drawing Sheets

U.S. PATENT DOCUMENTS

| | | |
|---|---|---|
| 5,662,870 A | 9/1997 | Walsh |
| 5,711,089 A | 1/1998 | Pikus |
| 5,940,982 A | 8/1999 | Braun |
| 6,098,307 A | 8/2000 | Pikus et al. |
| 6,147,129 A * | 11/2000 | Schwartz, Jr. ............. 521/48.5 |
| 6,716,959 B2 | 4/2004 | Borer |

* cited by examiner

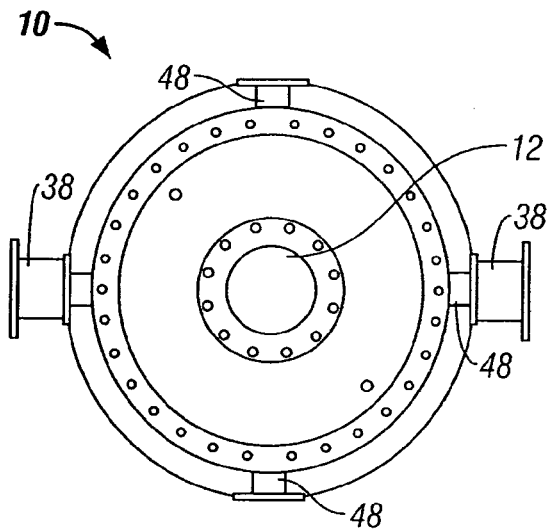
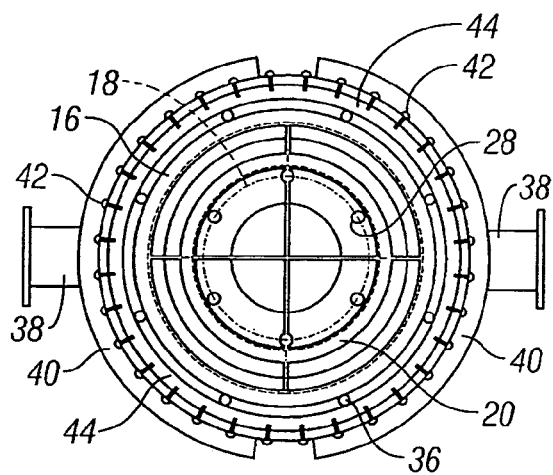
FIG. 2   FIG. 3
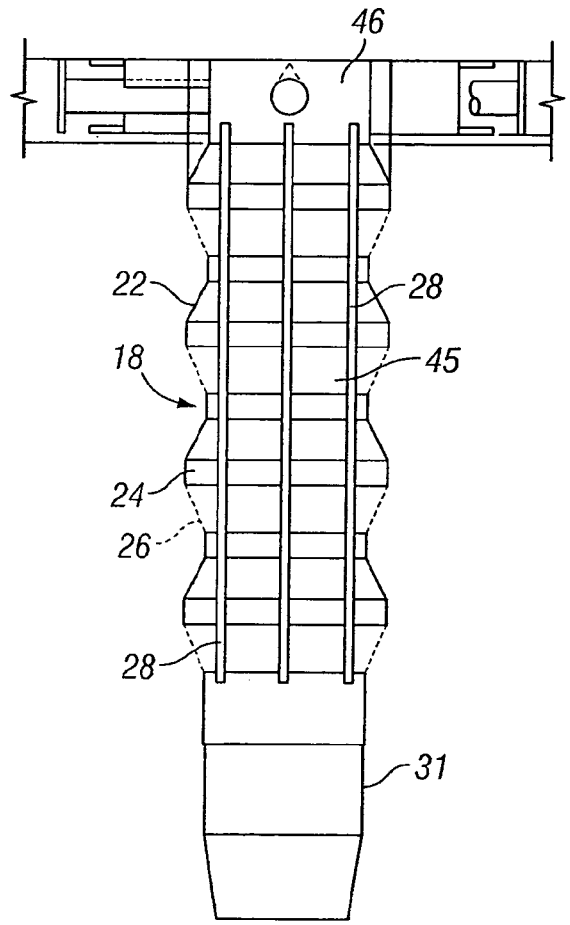
FIG. 4

HEATING AND DRYING APPARATUS FOR PARTICULATE MATERIAL

CROSS REFERENCE TO RELATED APPLICATIONS

The present application is a continuation of U.S. patent application filed Nov. 22, 2002 now U.S. Pat. No. 6,935,051 and assigned Ser. No. 10/302,807, the entire disclosure of which is incorporated herein by reference.

BACKGROUND OF THE INVENTION

This invention relates to a continuous gravity flow apparatus for heating and/or drying of particulate material. The invention is especially useful in connection with particulate material that, while undergoing thermal treatment, is prone to forming bonds resulting in sticking or bridging within the mass of material being treated. Such sticking or bridging will disrupt the rate of material flow thereby reducing the efficiency of the treatment operation. It is also possible that the sticking or bridging will cause non-uniformity from the standpoint of the desired treatment results.

The invention has particular application with respect to the treatment of polyester pellets in a solid phase polymerization process after initial crystallization and before introduction to a reactor. Thus, after initial crystallization, it has been found to be desirable to preheat such material before it is exposed to the reactor.

Devices currently used for a solid phase polymerization process are generally of two types, one type using indirect heat transfer through a horizontal hollow agitating rotor positioned in a jacketed trough. The Solidaire and TorusDisc equipment manufactured by Hosokawa Bepex Corporation of Minneapolis, Minn. are examples of such indirect heat transfer equipment.

The second type comprises equipment where the heat is transferred by direct contact of the particulate material with heated gas as in the case of a cross flow square shaped vertical gravity flow dryer. The Buhler Roof Dryer is an example of such equipment.

SUMMARY OF THE INVENTION

This invention comprises a gravity flow particulate material heater using a cross heating gas flow. The equipment has no moving parts and is cylindrical in shape which provides for efficient manufacturing and operating characteristics. The equipment also provides forced particle-to-particle motion thereby avoiding sticking or bridging problems.

The cylindrical housing of the equipment comprises a vertically disposed inner housing and a vertically disposed outer housing positioned in spaced apart surrounding relationship with respect to the inner housing. This results in the respective inwardly facing opposed wall surfaces of the housings defining an annular space for the receipt of the particulate material. To provide uniform material distribution for the gravity flow through the equipment, a specially designed inlet for the material is provided at the top of the annular space and a specially designed outlet for the material is provided at the bottom of the annular space.

The respective inner and outer housings are formed of alternating sections which angle radially inward and then radially outward relative to the vertical axes of the housings. The result is that annular space between the housings provides an undulating flow path for the particulate material.

The alternating sections include "perforated" sections and solid sections. For purposes of this disclosure, the perforations may take a variety of forms such as an array of spaced apart openings which may be circular, rectangular or of other shapes. The criteria for the openings is that they must be of a form that will contain product and permit the flow of gas into the annular space through the wall sections of one housing for contact with particulate material located in the annular space, and then flow of the gas through wall sections of the other housing for flow of the gas out of the annular space.

The perforated sections preferably comprise the sections of the outer housing which are angled radially outward, and the sections of the inner housing which are angled radially inward. With this arrangement, the perforated sections do not support the weight of particulate material located above the sections and this minimizes the opportunity for material entering into the openings in these sections.

Preferably, perforated wall sections alternate with solid wall sections. In addition, a perforated wall section of one housing will be located opposite a solid wall section of the other housing so that the gas will have a component of movement vertically in addition to horizontally when traversing the annular space.

A manifold construction is associated with the housing to encourage uniform distribution of the hot gas within the particulate material moving through the annular space. Preferably, this construction comprises a circumferentially extending chamber in communication with each of the perforated sections intended to receive the gas to be introduced to the annular space. In one form of the invention the gas can be introduced into one or more ring manifolds positioned on the midsection of the outer housing or vertically spaced between the top and bottom of the housing. The ring manifold or manifolds are designed to communicate with one or more chambers formed from top to bottom of the outer housing and extending all around the housing.

BRIEF DESCRIPTION OF THE DRAWINGS

FIG. 2 is a top plan view of the apparatus;

FIG. 3 is a horizontal sectional view of the apparatus taken about the line 3—3 of FIG. 1;

FIG. 4 is a vertical sectional view of the inner housing utilized in the apparatus;

DETAILED DESCRIPTION OF THE PREFERRED EMBODIMENT

Figure 1:
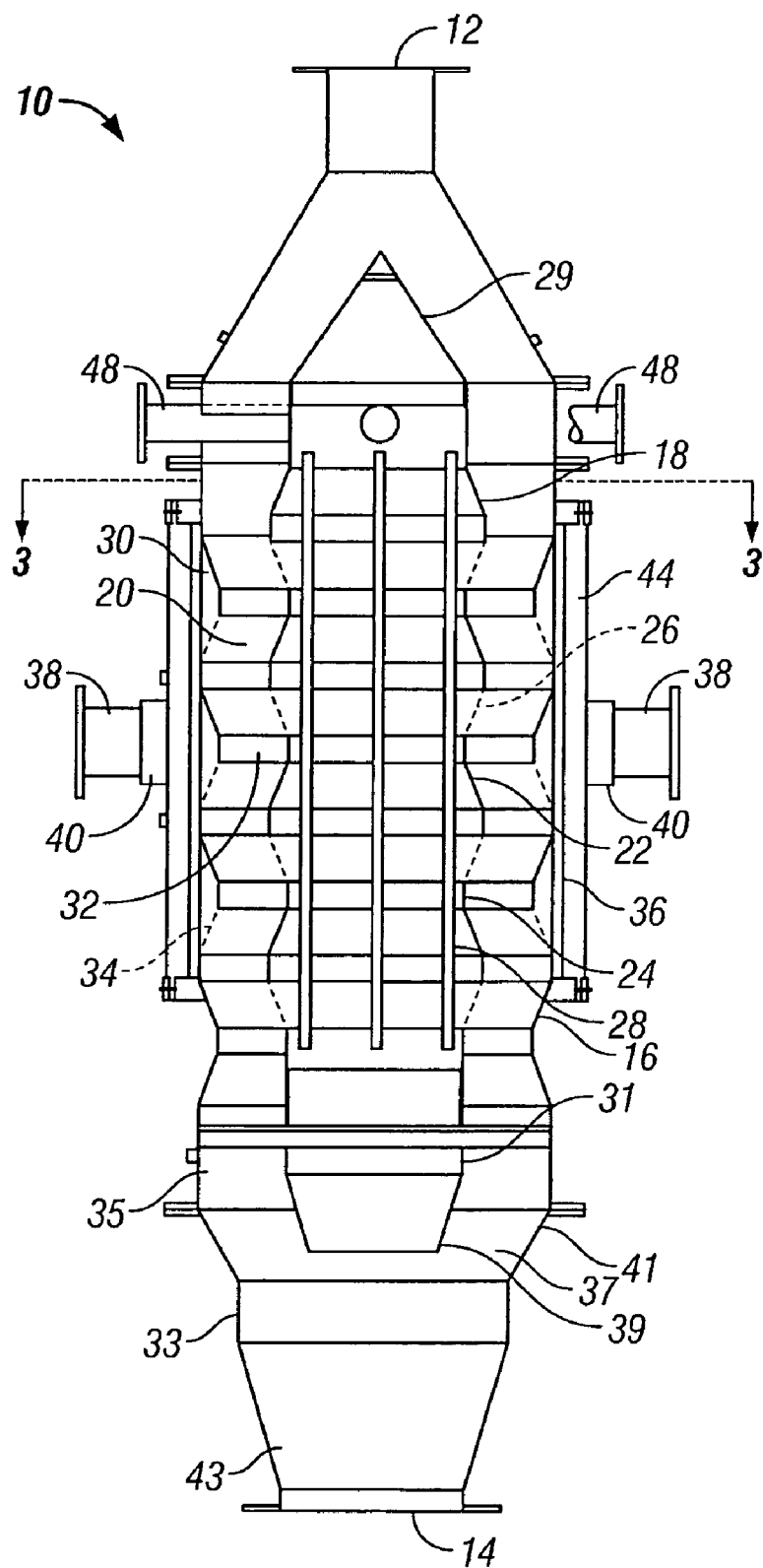
FIG. 1 is a vertical sectional view of the heating and drying apparatus of the invention.

The heating and/or drying apparatus 10 shown in FIG. 1 includes a particulate material inlet end 12 and a particulate material outlet end 14. The apparatus is positioned for gravity flow of particulate material from the inlet end to the outlet end preferably in "plug flow" fashion. Thus, sufficient material can be continuously introduced at the inlet end to compensate for the continuous discharge at the outlet end so that the material flow passage of the apparatus is substantially filled with material from top to bottom during operation of the apparatus.

The apparatus assumes a basically cylindrical shape and it includes cylindrical outer housing 16 and smaller diameter, coaxially disposed cylindrical inner housing 18. The opposed inwardly facing wall surfaces of the respective housings define an annular space 20 which forms the flow passage for the particulate material. The housing walls are formed of alternating cylindrical sections including sections which angle radially inward relative to the housing axes and those which angle radially outward. The result is that the flow passage 20 assumes an undulating shape. As illustrated, the inner housing is positioned concentric within the outer housing.

The inner housing 18 is shown in detail in FIGS. 1–5. This housing is constructed of conical sections 22 which extend angularly or radially outward relative to the vertical axis of the housing, intermediate cylindrical sections 24, and angularly or radially inward formed conical sections 26. The sections are welded together around their respective adjoining circumferential edges to form an assembled housing structure. Vertically extending reinforcing rods 28 are welded to the inside facing vertical surfaces of the intermediate sections 24. An upwardly extending cone 29 has a lower edge which slips over and is bolted to the top edge of the uppermost section 22. The cone shape insures that material introduced will be spread substantially evenly around the inner housing for passage through the apparatus.

Each of the inwardly angled conical sections 26 is "perforated" to permit flow of gas therethrough. As noted, this term should be understood to include a variety of opening configurations in the wall surface. As shown, these perforated sections preferably alternate with the outwardly angled conical sections 22 which are not perforated. In this embodiment, the intermediate cylindrical sections 24 are also not perforated.

The outer housing 16, as shown in FIG. 1–3 and 6–8, also comprises adjacent sections including conical sections 30 which extend radially inward relative to the vertical axis of the housing, intermediate cylindrical sections 32, and conical sections 34 which extend radially outward relative to the vertical axis. In the preferred embodiment illustrated, the conical sections 30 are not perforated and they are positioned horizontally opposite the perforated conical sections 26 of the inner housing 18. The conical sections 34 of the outer housing are perforated and they are positioned opposite the unperforated conical sections 22 of the inner housing. Reinforcing rods 36 are welded to the outside facing vertical surfaces of the intermediate sections 32.

The perforated conical sections 26 and 34 are located so that they do not bear the weight of the particulate material located in the apparatus. This minimizes the chance of the material entering into the openings of these sections which could restrict the free flow of gas.

Due to the provision of sections which alternately extend radially outward and then radially inward, the cross-section of the annular space 20 in the apparatus will shift between a maximum area and a minimum area, back to a maximum area, and so on, from the top to the bottom of the apparatus. This, along with the change in direction, results in mass flow variations which enhance the interaction between the material particles, and also the interaction between the gas and the particulate material. The intermediate cylindrical sections 24 and 32 function to reestablish the mass flow before the material moves from a zone in which the cross-sectional area has been gradually decreasing into a zone where the cross-sectional area is gradually increasing, and vice versa.

Alternatively, the angles assumed by the sections can be varied to maintain a constant cross-sectional area for the space 20 at intervals in the apparatus, or from top to bottom of the space, if desired. For example, the angle relative to the vertical axis of a downwardly depending section 30 could diverge further outwardly and the angle of the oppositely facing section 26 could diverge further inwardly so that the cross-sectional area defined between these sections would not change in the region of the space 20 from the top to the bottom of these sections. Similar variations in angles could be used to control the cross-sectional area at other locations of the space 20.

The outlet for the particulate material comprises a hopper configuration which includes the bottom wall portion 31 of the inner housing 18, this bottom wall portion extending beyond the heating zone of the apparatus. A surrounding bottom wall portion of the outer housing 16 is also provided. The preferred relationship of these bottom wall portions shown in FIG. 1 provides for an expanded cross-sectional area shown at 35 and then an area 37 of diminished cross-sectional area which is defined by conical wall parts 39 and 41 of the respective bottom wall portions of the inner and outer housings.

The expanded area 35 sets up enough vertical product contact pressure to assure mass flow in the "cone-in-cone' hopper section defined by the conical wall parts 39 and 41. This design also allows for the location of mechanical support for the inner housing 18 in the area 35. The material collects uniformly in hopper section 33 and then feeds into the lower section 43 of the outer housing for ultimate discharge through outlet 14.

As shown in FIGS. 1–3 and in greater detail in FIGS. 7–10, a manifold construction is provided for introducing hot gas to the apparatus. In the preferred embodiment illustrated, hot gas inlet nozzles 38 are provided on each side of the apparatus and these communicate, respectively, with one of the semi-cylindrical first stage distribution rings 40 which distribute gas around the outer circumference of the apparatus at the midsection thereof. Openings 42 defined by these rings communicate with vertically extending cylindrical chambers 44 whereby the gas is distributed all around the vertical extent of the outer housing 16. Reinforcing rods 38 also serve as supports of this manifold assembly.

Figure 5:
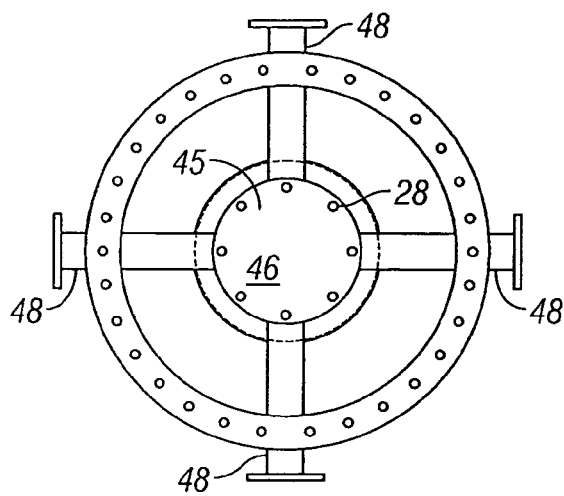
FIG. 5 is a top end view of the inner housing shown in FIG. 4.
Figure 6:
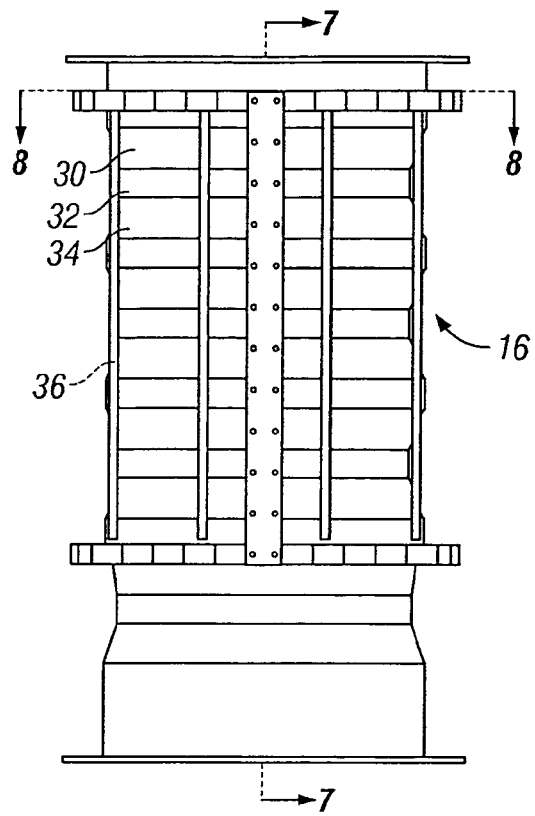
FIG. 6 is a vertical elevational view of the outer housing utilized in the apparatus.
Figure 7:
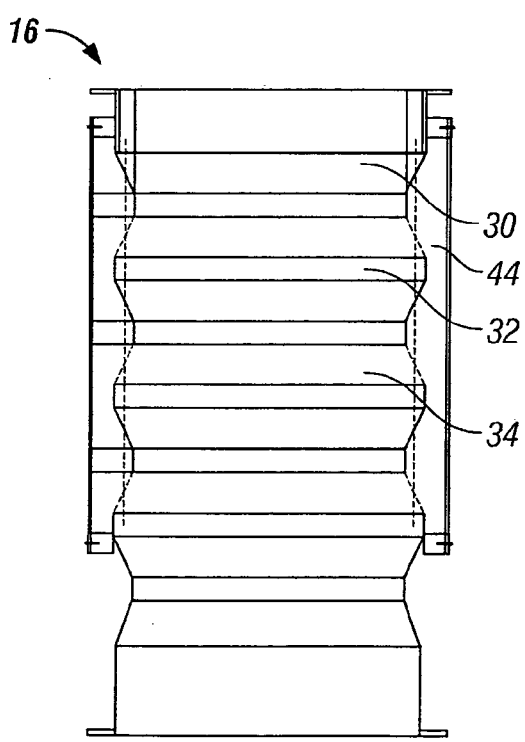
FIG. 7 is a vertical sectional view of the outer housing taken about the line 7—7 of FIG. 6.
Figure 8:
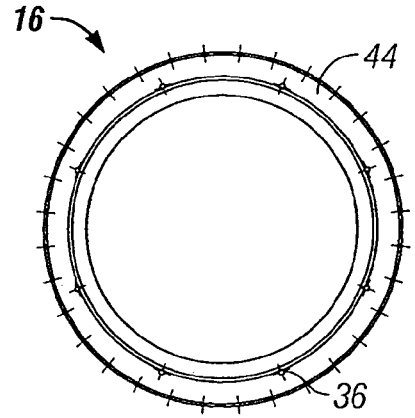
FIG. 8 is a horizontal sectional view of the outer housing taken about the 8—8 of FIG. 6.
Figure 9:
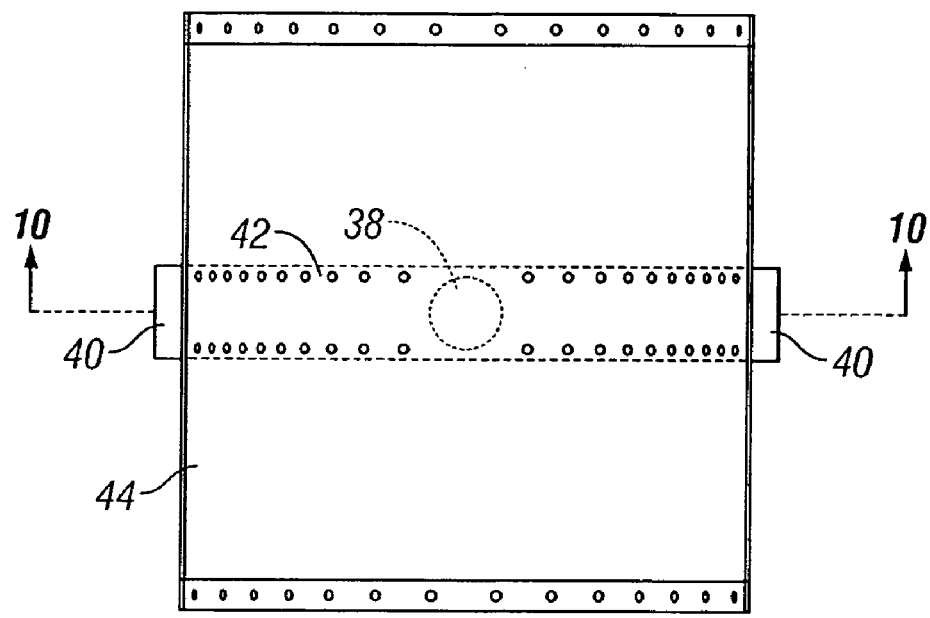
FIG. 9 is a vertical elevational view of the manifold structure utilized in the apparatus.
Figure 10:
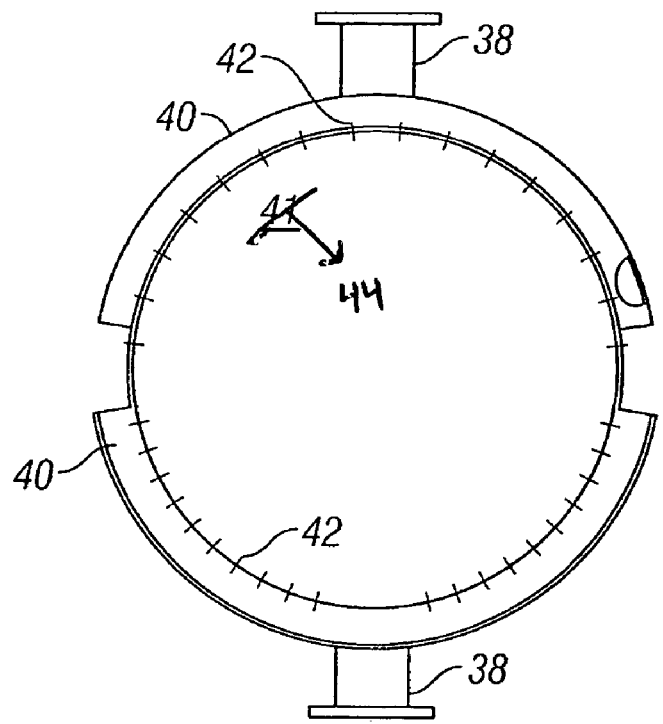
FIG. 10 is a cross-sectional view of the manifold structure taken about the line 10—10 of FIG. 9.

Gas exits from the chambers 44 through the perforated sections 34 of the outer housing 16 and enters into the annular space 20 for contact with the particulate material present in that space. The gas entering the annular space 20 will exit through perforated sections 26 of the inner housing 18 into the interior 45 of the housing (FIG. 5). A chamber 46 formed at the top of the housing comprises a gas exhaust manifold. Gas outlet nozzles 48 communicate with this chamber for flow of the gas outwardly of the apparatus.

Figure 11:
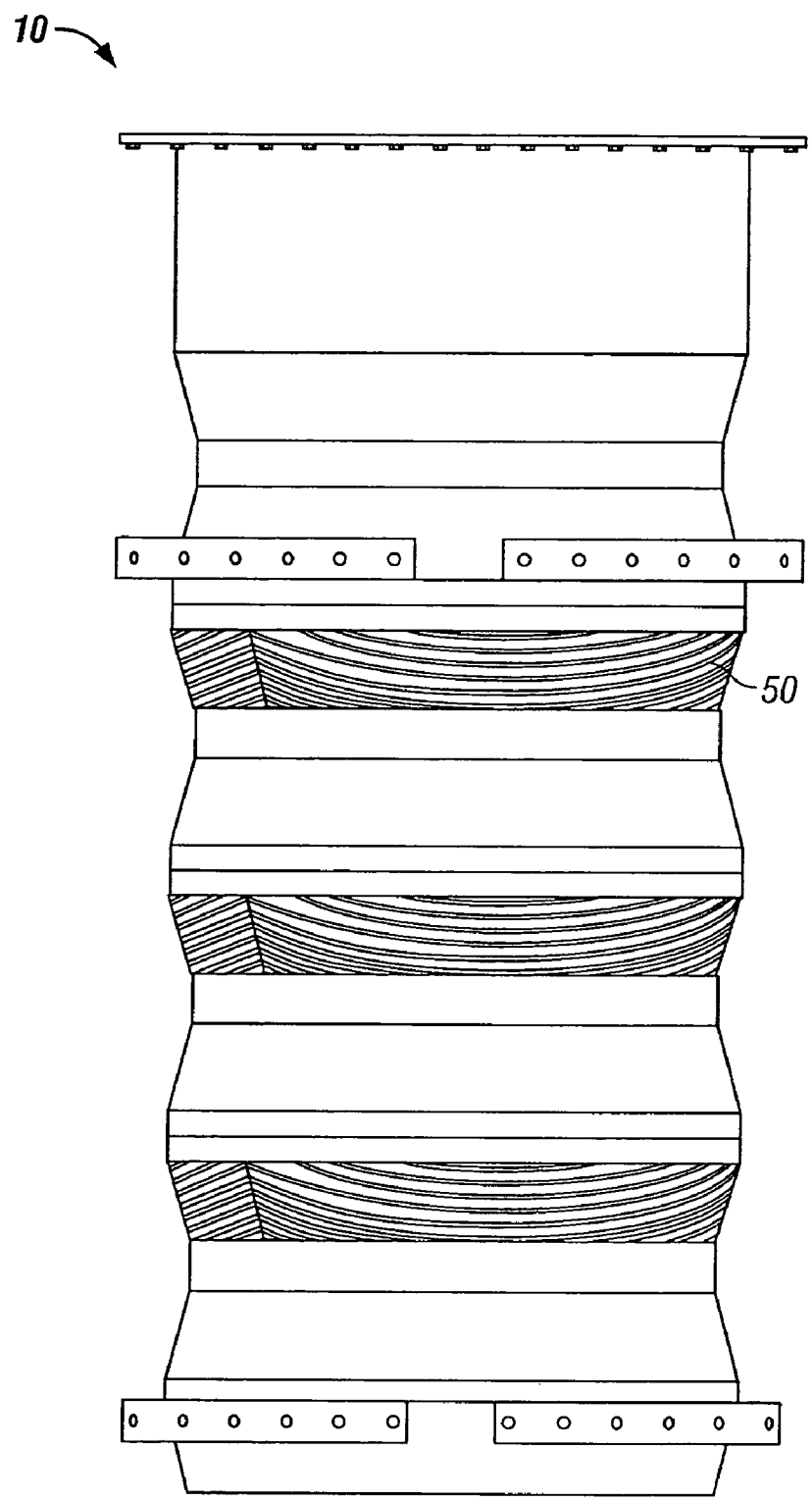
FIG. 11 is a fragmentary view of the outer housing illustrating a configuration for a perforated wall section; and, FIG. 12 is a fragmentary view of the inner housing illustrating a configuration for a perforated wall section.
Figure 12:
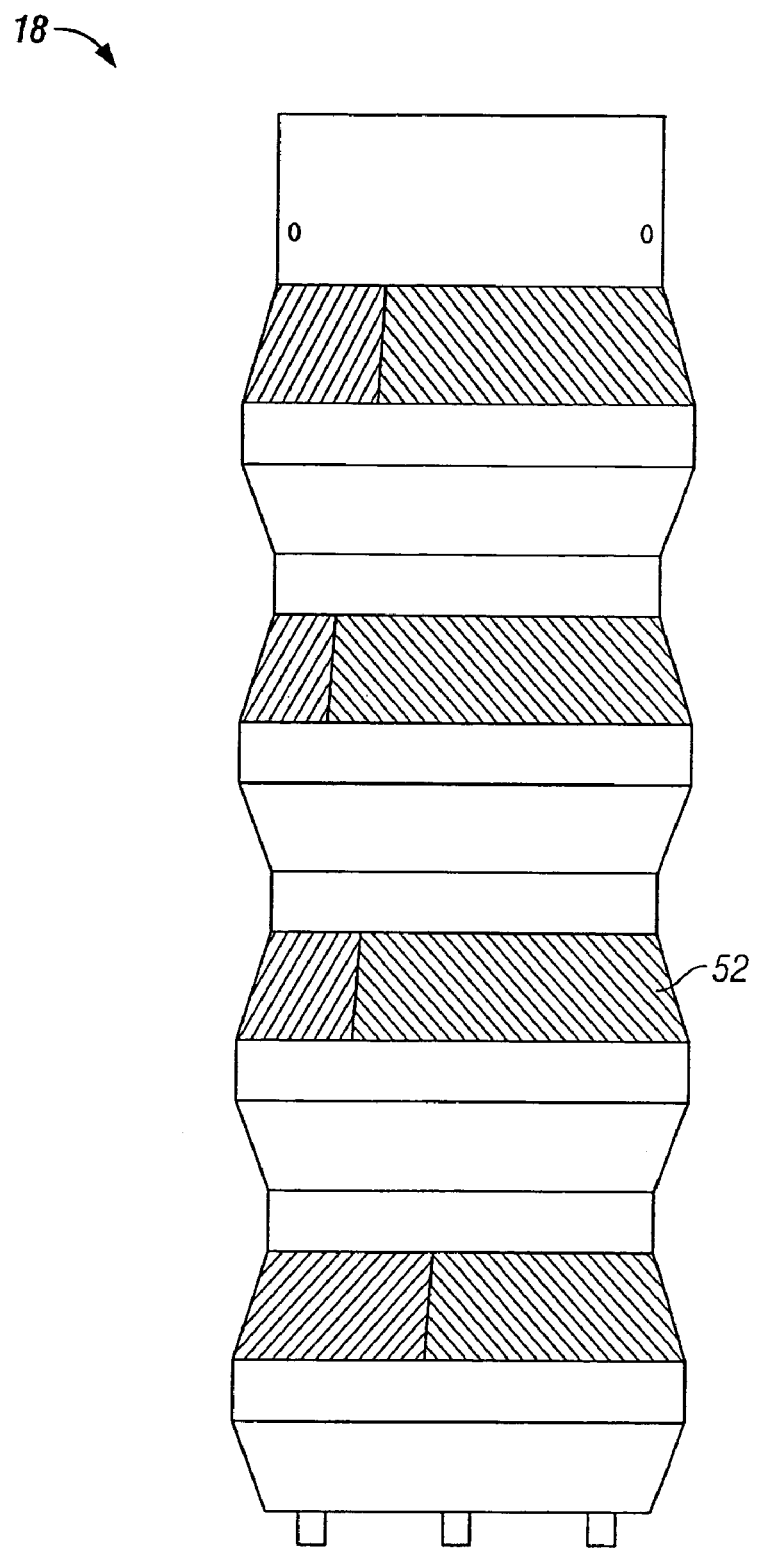

FIGS. 11 and 12 illustrate preferred forms for the perforated wall sections of the outer and inner housings. These wall sections are preferably made using Vee-Wire welded wire screens manufactured by Johnson Screens, or similar screens made by others. These screens are formed of parallel, spaced apart, elements which define relatively narrow slots between elements on one side of the screen. The walls of the elements taper away from these slots in a V pattern so that gradually wider spaces between adjoining elements are defined on the other side of the screen. Reinforcing bars 50 and 52 secure the elements in assembly and these bars are illustrated in FIGS. 11 and 12.

In the apparatus of this invention, hot gas enters into the heating zone through the wider spaces between the screen elements and then exits through the narrow slots for flow into contact with the particulate material on the other side of the screen. The gas exiting the heating zone will flow into the narrow slot side of the screens. Use of perforated sections with this design minimizes the likelihood of the material clogging the openings between the screen elements.

In FIG. 11, the elements forming the screens for the sections 34 of the outer housing extend generally vertically in an angular direction for approximately one quarter of the circumference, and then "zigzag" in the opposite direction. For the inner housing, as shown in FIG. 12, the elements forming the screen extend generally laterally to form the sections 26. Other orientations and combinations of the screens are also contemplated.

The apparatus described is generally useful for the heating and/or drying of particulate material with a particle size between 100 and 10,000 microns. Where solid polymers are being preheated from their crystallization temperature to their reaction temperature, a gas which will not result in any adverse developments in the material, such as nitrogen, is used.

The heating zone defined by the vertical extent of manifold chamber 44 can vary widely between about 50 inches and up to about 70 feet. The outer diameter of the outer housing 16 can vary between about 33 inches to about 12 feet and the outer diameter of the inner housing between about 18 to 20 inches up to 10 feet. Annular flow passage 20 will typically vary between about 13 and 24 inches in width but this width could be as little as 3 inches and as much as 3 feet. These dimensions are chosen, in particular, to be sufficiently great to avoid bridging or arching of the particulate material. The tendency toward bridging or arching will vary depending on the material being processed which accounts, in part, for the range of dimensions set forth. All of the above-stated dimensions can vary widely depending on the application and capacity involved.

The undulating nature of the flow passage can be provided using angular relationships for the housing wall sections varying between 10 and 35 degrees relative to the vertical axis of the apparatus. The velocity of the material moving through the apparatus will usually vary between 0.01 and 5 feet per minute depending on the material being processed, the particular equipment dimensions, and the desired residence time. The gas to solids flow rate ratio will also vary widely depending on these same factors with ratios of about 0.2 to 10 to 1 on a mass basis being contemplated.

In the operation of the apparatus 10, particulate material such as polyester pellets, is fed into the inlet end 12 and the material spreads over the cone 29 for even distribution and entry into the annular space or flow passage 20. The material moves under the influence of gravity toward the outlet end 14. As the material progresses through the flow passage it is also subject to the influence of the gas entering through the perforations defined by the conical sections 34 of the outer housing 16.

The particulate material follows an undulating path which, as described above, may have a continuously varying cross-sectional area as it progresses from the inlet to the outlet. These are factors which encourage the development of forces which in turn encourage particle-to-particle movement within the material. In addition, the gas entering transversely of the material flow encourages relative movement between particles. This is particularly true where the offset of the sections 26 and 34 is employed because the flow of gas is at an angle and has both vertical and horizontal components as it moves from one perforated section to another.

The apparatus described, because of the relative particle-to-particle movement, and because of the dimensional considerations which prevent bridging or arching, provides for the flow of particulate material through the apparatus in a manner which discourages sticking of particles one to the other. The apparatus involves engagement of the material only with the gas being introduced as opposed to the use of rotors or other moving mechanical engaging means of a similar kind. In addition to reducing or eliminating the sticking and bridging problems, the unique design of the apparatus encourages gas distribution to thereby achieve uniform heat distribution within the particulate material to enhance the effectiveness of the preheating and to reduce product quality variations.

Although the invention has been described with reference to the flow of gas entering through the wall of the outer housing and then flowing out through the wall of the inner housing, this could be reversed without changing the fundamental operation of the invention. It will also be understood that various other changes and modifications may be made in the practice of the invention without departing from the spirit thereof particularly as defined in the following claims.

That which is claimed is:

1. An apparatus for the heating or drying of particulate material comprising a vertically disposed inner cylindrical housing, a vertically disposed outer cylindrical housing positioned in surrounding relationship with said inner housing, the respective housings having inwardly facing opposed wall surfaces which define an annular space between said housings, said annular space having an inlet end adjacent the top of the housings and an outlet end adjacent the bottom of the housings, means for introducing particulate material into said inlet end and means for removing the particulate material from said outlet end, each of said opposed wall surfaces defining alternating radially inward directed and radially outward directed circumferential sections whereby said annular space defines an undulating path from said inlet end to said outlet end, perforations defined by spaced apart sections of each wall surface wherein each wall surface is defined by circumferential perforated sections which alternate with circumferential sections without perforations, and wherein the perforated sections of the wall surface defined by said outer housing are angled radially outward relative to the vertical axis of the outer housing, and the perforated sections of the wall surface defined by the inner housing are angled radially inward relative to the vertical axis of the inner housing, and means for introducing gas to said annular space through the perforated sections of one wall surface and means for withdrawing gas from said annular space through the perforated sections of the other wall surface whereby the particulate material is exposed to said gas as it moves between said inlet end and said outlet end.

2. An apparatus according to claim 1 wherein said means for introducing gas comprises a manifold assembly extending around said outer housing and communicating with said perforated sections of the outer housing.

3. An apparatus according to claim 2 wherein said manifold assembly includes portions extending vertically over substantially the entire height of said outer housing.

4. An apparatus according to claim 3 including at least one ring manifold extending circumferentially around said outer housing and adapted to feed gas to said portions extending vertically.

5. An apparatus according to claim 3 wherein said means for withdrawing gas comprises a gas exhaust manifold located at the top of the inner housing.

6. An apparatus according to claim 1 including cylindrical bands connected between said perforated sections and said sections without perforations to hold the sections in assembly to thereby form the respective outer and inner housings.

7. An apparatus according to claim 6 including vertically disposed bars attached to said bands for reinforcing said housings.

8. An apparatus according to claim 1 including an upwardly extending cone formed on top of said inner housing, said means for introducing particulate material operating to bring the material into engagement with said cone for delivering the material uniformly around said inlet opening.

9. An apparatus according to claim 8 including a hopper located at the bottom of said annular space for collecting said material as it passes through said outlet end.

10. An apparatus according to claim 9 wherein said hopper is formed by a bottom wall portion of said inner housing and a surrounding bottom wall portion of said outer housing, the area defined between said bottom wall portions including an upper area of greater cross section relative to the cross section of the area defined at the bottom end of said annular space, and said area defined between said bottom wall portions including a lower area of smaller cross section than said upper area.

11. An apparatus according to claim 10 wherein said lower area is defined by an inverted conical section of the inner housing bottom wall portion and a surrounding inverted conical section of the outer housing bottom wall portion.

12. An apparatus according to claim 1 wherein said particulate material comprises polyester pellets and wherein said gas is a hot gas.

13. An apparatus according to claim 1 wherein said annular space has a width sufficient to prevent bridging or arching of the particulate material present in the annular space.

14. An apparatus according to claim 1 wherein said perforated sections are formed of welded wire screens formed of spaced-apart elements, adjacent elements defining narrow slots for entry of gas and wider outlets for discharge of gas.

15. An apparatus according to claim 1, wherein said perforated sections are perforated in that they will contain product and permit the flow of gas into the annular space through the wall sections of one housing for contact with particulate material located in the annular space, and then flow of the gas through the wall sections of the other housing for flow of the gas out of the annular space.

16. An apparatus according to claim 15 wherein the perforated sections comprise an array of spaced apart openings.

17. An apparatus according to claim 1 wherein the apparatus provides for the flow of particulate material through the apparatus in a manner which discourages sticking of particles to one another.

18. An apparatus according to claim 1 wherein the direction of flow of gas entering through the wall can be reversed without changing the fundamental operation of the apparatus.

19. An apparatus according to claim 17 wherein the direction of flow of gas entering through the wall can be reversed without changing the fundamental operation of the apparatus.

* * * * *